(12) United States Patent
Vaidyanathan

(10) Patent No.: US 8,826,608 B2
(45) Date of Patent: Sep. 9, 2014

(54) MINIMAL PENETRATION MODULAR ROOF-TOP MOUNTING RACKS AND SOLAR PHOTOVOLTAIC SYSTEMS INCORPORATING THE SAME

(71) Applicant: Chandramouli Vaidyanathan, Eagan, MN (US)

(72) Inventor: Chandramouli Vaidyanathan, Eagan, MN (US)

( * ) Notice: Subject to any disclaimer, the term of this patent is extended or adjusted under 35 U.S.C. 154(b) by 0 days.

(21) Appl. No.: 14/043,569

(22) Filed: Oct. 1, 2013

(65) Prior Publication Data

US 2014/0090316 A1    Apr. 3, 2014

Related U.S. Application Data

(60) Provisional application No. 61/708,675, filed on Oct. 2, 2012.

(51) Int. Cl.
*E04D 13/18* (2014.01)
*E04H 14/00* (2006.01)
*F24J 2/52* (2006.01)

(52) U.S. Cl.
CPC ...................................... *F24J 2/5245* (2013.01)
USPC .......................... 52/173.3; 52/653.1; 136/245

(58) Field of Classification Search
USPC ................. 52/173.3, 653.1; 182/45; 136/245
See application file for complete search history.

(56) References Cited

U.S. PATENT DOCUMENTS

| | | | |
|---|---|---|---|
| 1,365,996 A * | 1/1921 | Herwick .......................... | 182/45 |
| 5,022,929 A * | 6/1991 | Gallois-Montbrun ........ | 136/246 |
| 6,003,629 A * | 12/1999 | Cloutier et al. ................. | 182/45 |
| 6,809,251 B2 * | 10/2004 | Dinwoodie .................... | 136/251 |
| 7,592,537 B1 | 9/2009 | West | |
| 8,272,174 B2 | 9/2012 | Stearns et al. | |
| 8,448,407 B1 | 5/2013 | Wiener | |
| 2002/0153200 A1* | 10/2002 | Bryant ............................. | 182/45 |
| 2007/0062761 A1* | 3/2007 | Megna et al. ................... | 182/45 |
| 2008/0006481 A1* | 1/2008 | Vieira ............................... | 182/45 |
| 2010/0186320 A1* | 7/2010 | Hoeft et al. .................. | 52/173.3 |
| 2010/0205877 A1* | 8/2010 | Varde et al. .................. | 52/173.3 |
| 2010/0212714 A1* | 8/2010 | Rothschild et al. ........... | 136/244 |
| 2010/0236164 A1* | 9/2010 | Chuang et al. ............... | 52/173.3 |
| 2011/0000152 A1* | 1/2011 | Botke ......................... | 52/173.3 |
| 2011/0225904 A1* | 9/2011 | Railkar et al. ............... | 52/173.3 |
| 2011/0253193 A1* | 10/2011 | Korman et al. ............... | 136/245 |
| 2011/0308574 A1 | 12/2011 | Vaidyanathan | |
| 2012/0012154 A1* | 1/2012 | Keller et al. .................. | 136/245 |
| 2012/0152326 A1 | 6/2012 | West et al. | |
| 2012/0234378 A1 | 9/2012 | West et al. | |
| 2012/0266946 A1 | 10/2012 | West et al. | |
| 2012/0298817 A1 | 11/2012 | West et al. | |
| 2012/0301661 A1 | 11/2012 | West et al. | |
| 2014/0026946 A1 | 1/2014 | West et al. | |

* cited by examiner

*Primary Examiner* — Brian Glessner
*Assistant Examiner* — Brian D Mattei
(74) *Attorney, Agent, or Firm* — Billion & Armitage; Benjamin C. Armitage

(57) ABSTRACT

The present invention provides for a modular, plug-and-play DC/AC compatible solar photovoltaic power system and mounting frames therefor, having inexpensive modular designs which require no or minimal penetration for rooftop installation and provide enhanced wind-induced position disruption protection.

13 Claims, 6 Drawing Sheets

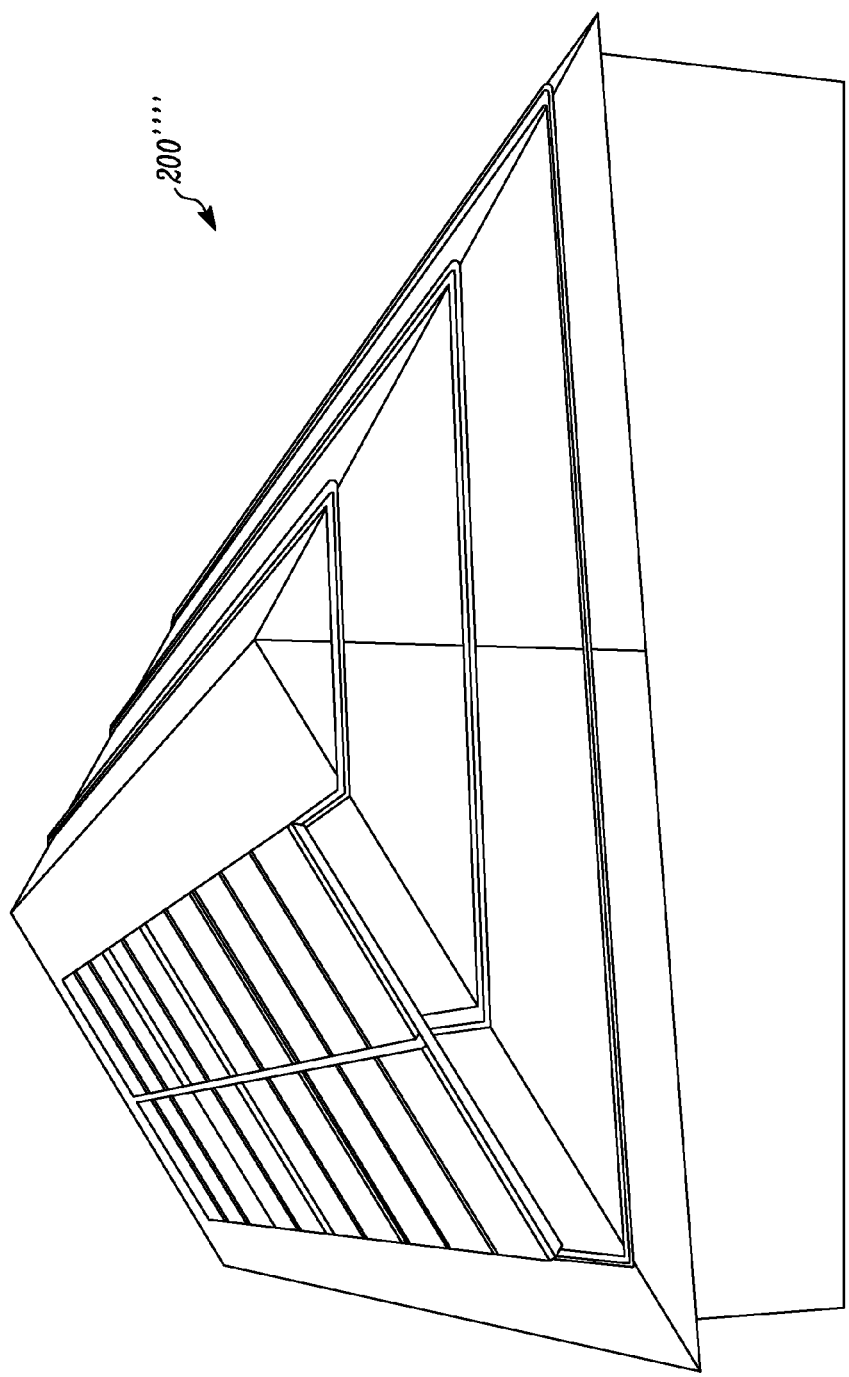
FIG. 2A''''

MINIMAL PENETRATION MODULAR ROOF-TOP MOUNTING RACKS AND SOLAR PHOTOVOLTAIC SYSTEMS INCORPORATING THE SAME

CROSS-REFERENCE TO RELATED APPLICATIONS

This application claims priority under 35 U.S.C. §119(e) to U.S. Provisional Patent Application No. 61/708,675, filed on 2 Oct. 2012, which is incorporated herein by reference in its entirety.

BACKGROUND

Electrical power generation units, for example renewable energy systems such as solar photovoltaic systems, may be connected to an electrical utility grid or act as stand-alone power generation units and have become popular with home and business owners. It is common for customers to purchase solar photovoltaic systems for both purposes, such systems being most commonly installed on rooftops. Basic roof top solar photovoltaic systems involve one or more standardized solar panels which are attached to or integrated with mounting racks. Solar photovoltaic systems, including the solar photovoltaic panels, inverter, and mounting racks are designed and installed by providers, and typically must be customized for particular customers. The number of panels per system, electrical connections between individual panels, power-consuming devices, and the electric utility grid, zoning conditions, and installation site accessibility, among other factors, can significantly increase system prices.

Roof installation involves anchoring the system at a number of points throughout, requiring penetration at a number of anchor points. Each anchoring point 100, such as the one shown in FIG. 1, typically employs a lag bolt 101 or similar fastening element which penetrates all layers of the roof 110, which may include shingles, tar or felt paper, ice guard, the roof deck, flashing, and ridge caps, decreasing the sealing integrity of the roof. Anchoring point fasteners ideally, and often must, further penetrate roof rafters or trusses 111 for added strength against high winds and other elements, further increasing installation costs.

Further, roof construction, replacement, and overall life spans will not necessarily coincide with a solar photovoltaic system installation's lifespan, or a roof may become damaged by hail, falling trees or other like occurrences that will necessitate replacement or repair of the roof. In the event of such occurrences, roof-penetrating anchoring systems may need to be uninstalled and reinstalled a number of times, thereby detrimentally affecting overall system economics.

SUMMARY

Embodiments of the invention relate to modular roof-top mounting frames which require minimal or no penetration for rooftop installation and are capable or accepting solar panels or may be integrated into plug-and-play solar photovoltaic systems. Mounting frames may comprise a plurality of hinged brackets each having a first arm and a second arm connected at hinge point. When the plurality of hinged brackets are aligned or connected, the plurality of first arms align to substantially form a first plane and the plurality of second arms align to substantially form a second plane. One or more photovoltaic solar panels may be mounted throughout the first plane, throughout the second plane, or throughout both the first plane and throughout the second plane.

Solar photovoltaic systems which incorporate various embodiments of mounting frames described herein may further comprise one or more solar panels, an electrical power generation unit, a power inverter, and a power outlet, which may be connectible to energy storage units, electrically-powered devices, or an electric utility grid.

BRIEF DESCRIPTION OF THE DRAWINGS

The accompanying drawings illustrate non-limiting example embodiments of the invention.

DETAILED DESCRIPTION

Figure 1:
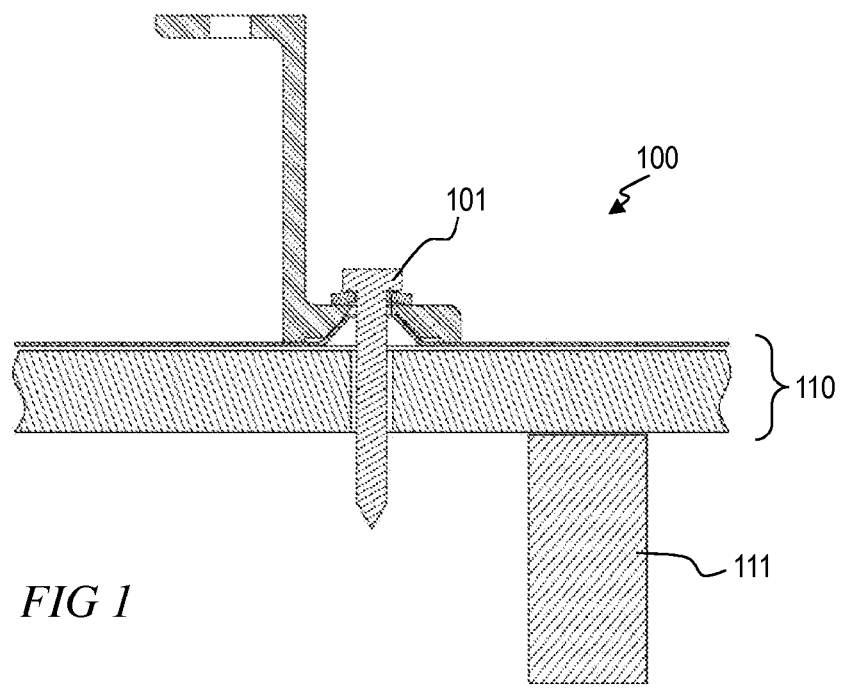
FIG. 1 is a cross-sectional side view of a roof-penetrating anchor, according to the prior art.

Embodiments of the invention relate to modular roof-top mounting frames which require minimal or no penetration for rooftop installation and are capable of accepting solar panels or may be integrated into plug-and-play solar photovoltaic systems. Mounting frames may comprise a plurality of hinged brackets each having a first arm and a second arm connected at hinge point. When the plurality of hinged brackets are aligned or connected, the plurality of first arms align to substantially form a first plane and the plurality of second arms align to substantially form a second plane. One or more photovoltaic solar panels may be mounted throughout the first plane, throughout the second plane, or throughout both the first plane and throughout the second plane.

Solar photovoltaic systems which incorporate various embodiments of mounting frames described herein may further comprise one or more solar panels, an electrical power generation unit, a power inverter, and a power outlet, which may be connectible to energy storage units, electrically-powered devices, or an electric utility grid.

Throughout the following description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated. The terms "above" and "below" are used to describe two different directions in relation to the center of a composite and the terms "upper" and "lower" may be used to describe two different surfaces of a composite. In the appended aspects or claims, the terms "first", "second" and "third", etc. are used merely as labels, and are not intended to impose numerical requirements on their objects.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range.

Figure 2A:
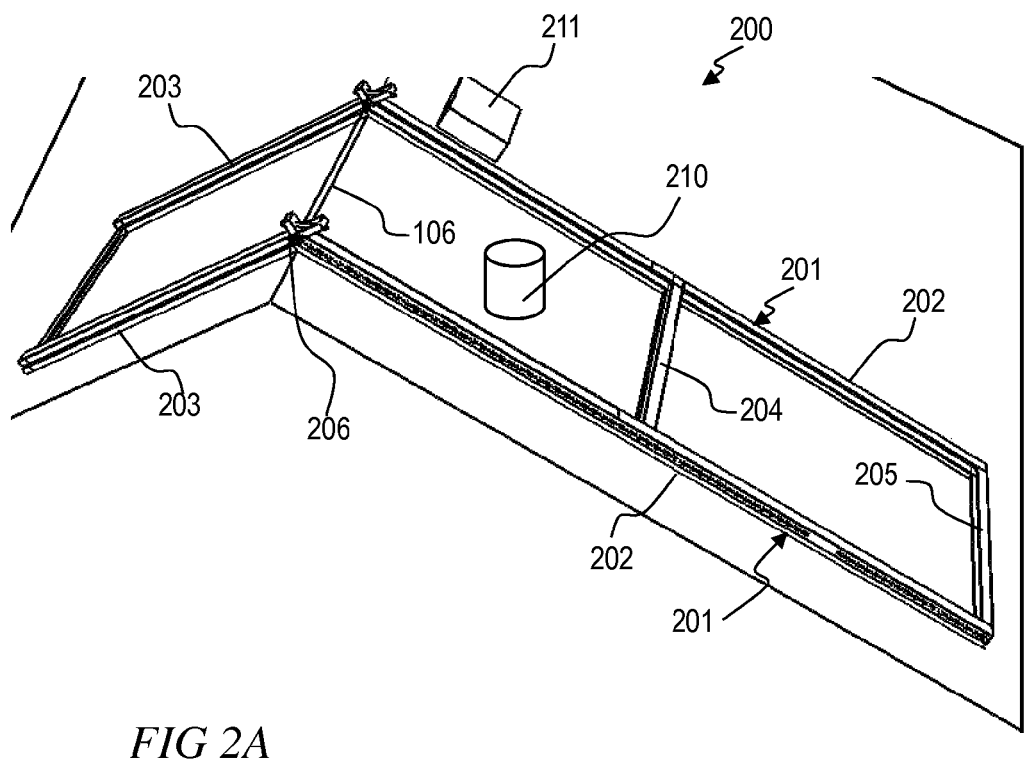
FIG. 2A is a perspective view of a modular mounting frame positioned at a roof line.
Figure 2A:
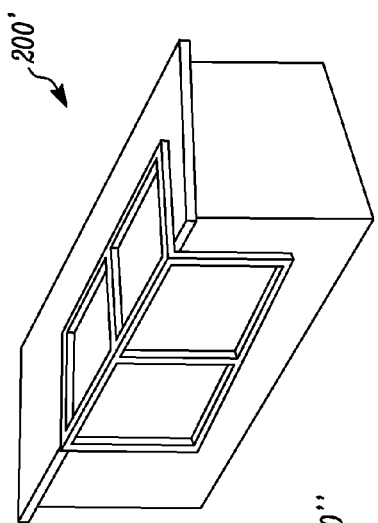
Figure 2A:
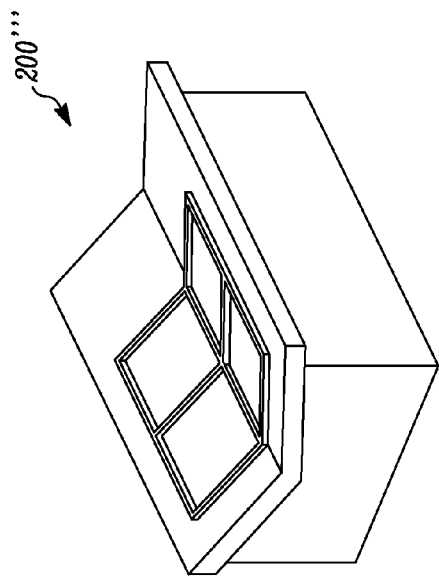
Figure 2A:
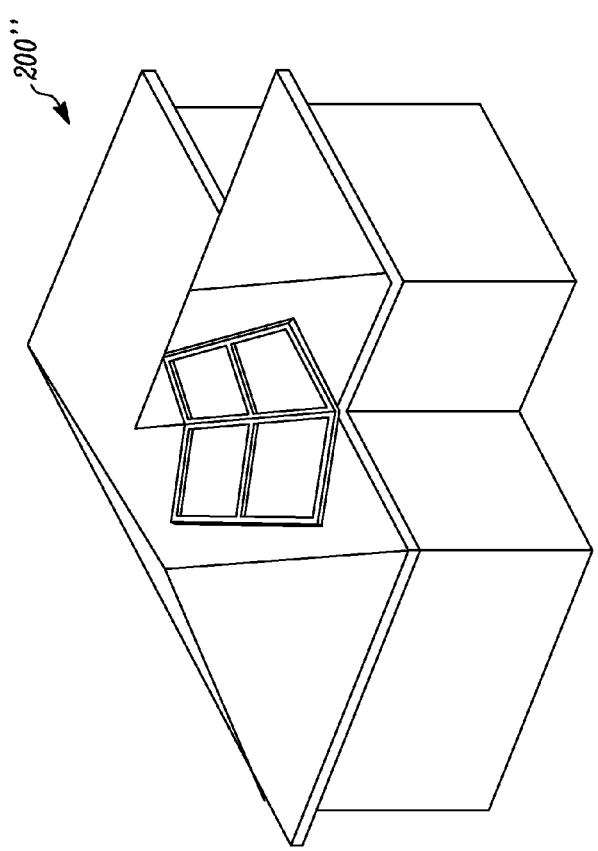
Figure 2B:
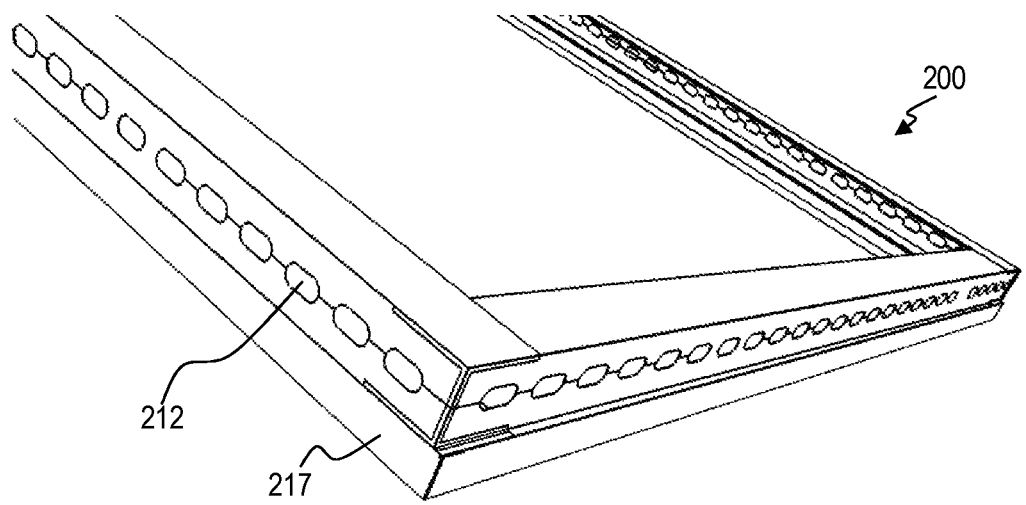
FIG. 2B is a perspective view of a mounting frame having holes spaced throughout its arms and end caps.

Mounting frames as described herein may refer to stand-alone frames or integrated components of solar photovoltaic power systems. FIG. 2A depicts a basic modular mounting frame 200, comprising two hinged brackets 201. Each bracket has a first arm 202 and a second arm 203, connected by a hinge 206. Hinges 206 may be adjusted on-site and locked into position so as to place a compression load on a rooftop. FIG. 2E shows a zoomed-in view of hinge 206, and bolt 207 used for adjusting and locking the hinge 207 according to some embodiments. Adjustable hinges allow the system to be adjusted for irregular rooftop surfaces, marginal differences in shingle thickness, and other non-uniformities. In some embodiments the first arm 202 and second arm 203 are connected via welding or other immovable mechanical means such as bolts. Embodiments may also include perpendicular cross beams 204 and end caps 205, as shown in FIG. 2A, to enhance the structural integrity, provide additional mounting surface for solar panels, or to provide wind-blocking protection. Perpendicular cross beams may be positioned anywhere throughout the lengths of the firm arms 202 or second arms 203, and may also connect at the hinges 206. The hinges 206 or connection points of each bracket are positioned proximate to a roof line 106 as shown in FIG. 2A, and maintained in position by the weight of the mounting frame or overall solar photovoltaic system. A roof line may be a roof peak, a roof valley, or a roof edge.

When multiple hinged brackets are combined, the two first arms align to substantially form a plane, on which solar panels may be mounted. The second arms align to substantially form a plane, on which solar panels may also be mounted. One or more solar panels may be mounted on the first plane, on the second plane, or on both planes. Mounting frames will often contain solar panels on the first plane, or the second plane, depending on the orientation to the sun. The first arms and second arms may be lengthened or shortened to accommodate for more or larger solar panels, available rooftop space, rooftop shape, or ballasting concerns. FIG. 2D shows an embodiment of an adjustable arm 213. All first arms need not be the same length, and all second arms need not be the same length. For example, a particular mounting frame may have 4 hinged brackets, wherein two adjacent first arms are each 10 feet long and two adjacent first arms are each 15 feet long. In this particular example embodiment, the second arms may be any length, for example 5 feet. Similarly, first arms and second arms need not be the same length, as shown in FIG. 2A.

The embodiments disclosed herein may be advantageously mounted to a rooftop without penetrating any layers of the roof, thereby avoiding damage to the rooftop and minimizing installation costs. Adhesive 217, as shown in FIG. 2B, may be used to secure the mounting frame to a rooftop, and also prevent wind flow between the mounting frame and the roof, or between the roof and any solar panels attached to or integrated with the mounting frame. In some embodiments, the adhesive 217 will have a coefficient of thermal expansion value between the coefficient of thermal expansion of the contacting roof surface and the coefficient of thermal expansion of the contacting mounting frame surface. In some embodiments the adhesive 217 is butyl rubber.

Figure 2C:
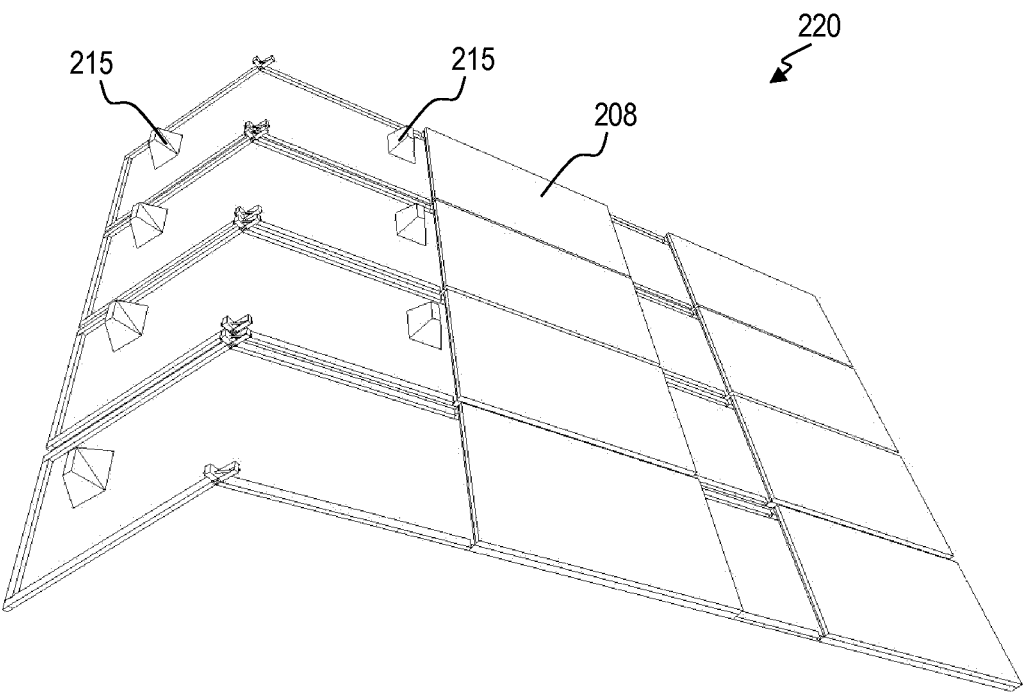
FIG. 2C is a perspective view of a mounting frame equipped with a plurality of solar panels and mounting weights.
Figure 2D:
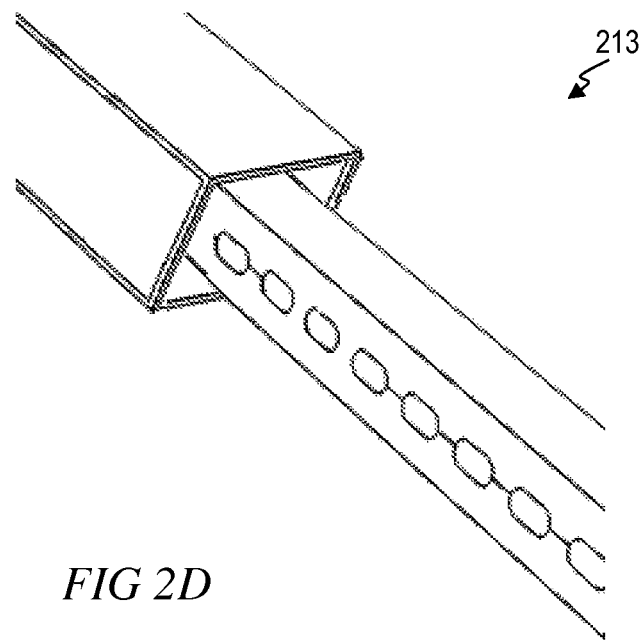
FIG. 2D is a perspective view an adjustable arm, according to some embodiments.
Figure 2E:
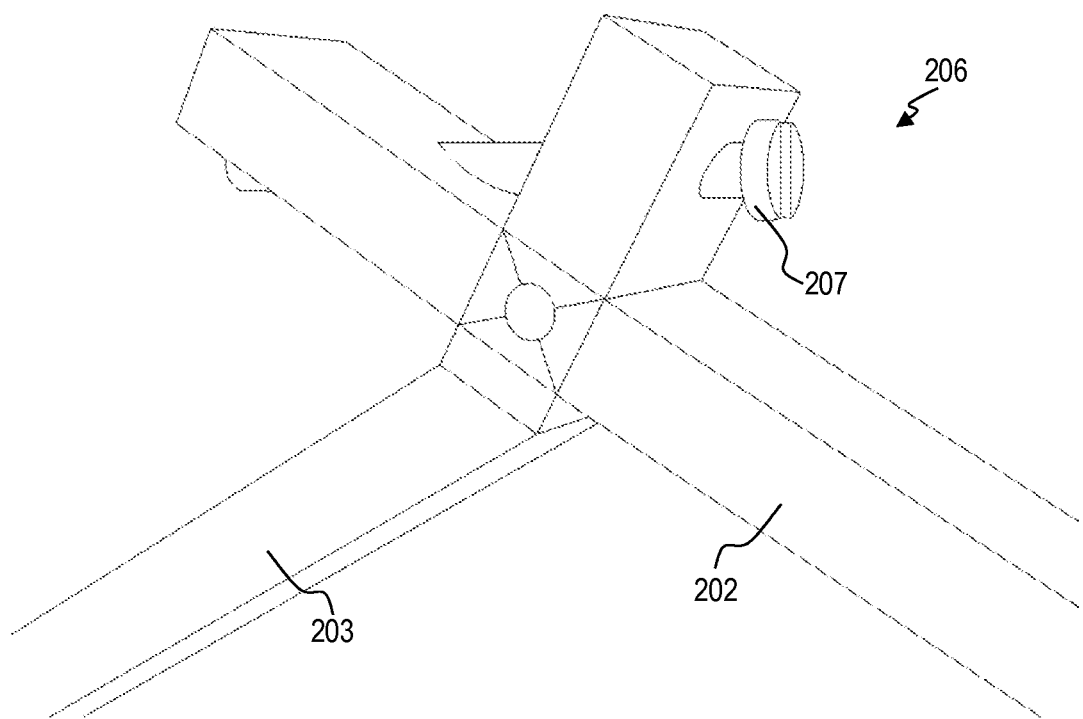
FIG. 2E is a perspective view of an adjustable and lockable hinge, according to some embodiments.

A modular design allows for a plurality of hinged brackets to be incorporated in a solar mounting frame 220, as shown in FIG. 2C. Additional hinged brackets may be added based on roof size, solar panel 208 size, structural integrity, or other concerns. The modular design also allows for quick customization of a solar photovoltaic system to any roof. For example, rooftop obstructions such as vent pipes 210, skylights 211, chimneys, or the like, may be easily avoided, as shown in FIG. 2A. Additionally, orientation of solar panels to the sun is a critical factor in power generation. The modular no-penetration and minimal-penetration systems described herein allow for versatile and easily customizable solar photovoltaic power systems to be efficiently oriented and installed to maximize power generation. The modular and no-penetration and minimal-penetration designs additionally allow for simple, cost-effective system modifications relating to power generation optimization.

Arm length may also be adjusted for ballasting concerns. The first arms, the second arms, or both the first arms and the second arms may act as ballasting arms. The arms may also be weighted to accomplish ballasting of the mounting frame. For example, where a roof gable is shallow (i.e. about 15 degrees), longer arms are required to ballast the mounting frame. Conversely, a steeper gable (i.e. about 45 degrees) will require a shorter ballasting arm. If rooftop space, rooftop shape, aesthetic concerns, or other considerations limit the length to which a ballasting arm may be extended, the ballasting arm may be weighted to compensate for any deficiency in length. Weights 215 may also be added for further stability, as shown in FIG. 2C, even where no deficiency in ballasting arm length exists. Weights may be attached directly to any part of the mounting frame, or extended between the arms. For example, increased panel weight on the first plane may require additional ballasting weight on the second plane, increased length of second arms, or a combination thereof. Weights 215 may be incorporated anywhere throughout a mounting frame, as needed for ballasting.

High winds can disrupt the position of a mounting frame on a roof, particularly when a large number or solar panels are attached thereon, or a high amount of solar panel surface area is present. For example, for a mounting frame or solar photovoltaic power system positioned on a two-plane roof, or a roof with a peak edge oriented from East to West, a high wind in a North-to-South direction will create a high pressure area on the North side and a low pressure area on the South side.

The pressure differential will cause the mounting frame to change positions or even lift entirely off the rooftop.

Embodiments of the mounting frame described herein provide a number of features to prevent wind-induced position disruption, such as the sealing adhesive, wind-blocking end caps, and customizable ballasting features as described above. Some embodiments further comprise a plurality of holes or openings 212, as shown in FIG. 2B. When mounting frames are integrated with solar photovoltaic power generating components, such as a power inverter, it may become necessary to provide ventilation such that necessary components are maintained at suitable temperatures or pressures. For example, a power inverter may need to be kept at ambient temperatures. Openings or holes spaced through one or more of the first arms, second arms, perpendicular cross beams, end caps, or combinations thereof reduce wind velocity to acceptable levels between the mounting frame, solar panels, or other system components while providing adequate ventilation, pressure release, or both. Acceptable levels or velocity are those that do not create lift sufficient to disrupt the position of a mounting frame. For example, a highly-ballasted mounting frame with lower solar panel surface area would have a higher acceptable wind velocity than a lesser-ballasted mounting frame with higher solar panel surface area. After careful review of the disclosure herein, one of skill in the art shall be enabled to customize a mounting frame for any particular purpose. For example, a solar photovoltaic power system operating in a high-wind, high-heat environment on a shallow roof gable may require, for example, many holes or openings throughout the hinged brackets, long first and second arms, and ballast weights. In other embodiments, holes or opening sizes may differ between various arms, perpendicular cross beams, and end caps. For example, a mounting frame having four hinged brackets may have larger holes on the inner arms and small holes on the outer arms.

Figure 3:
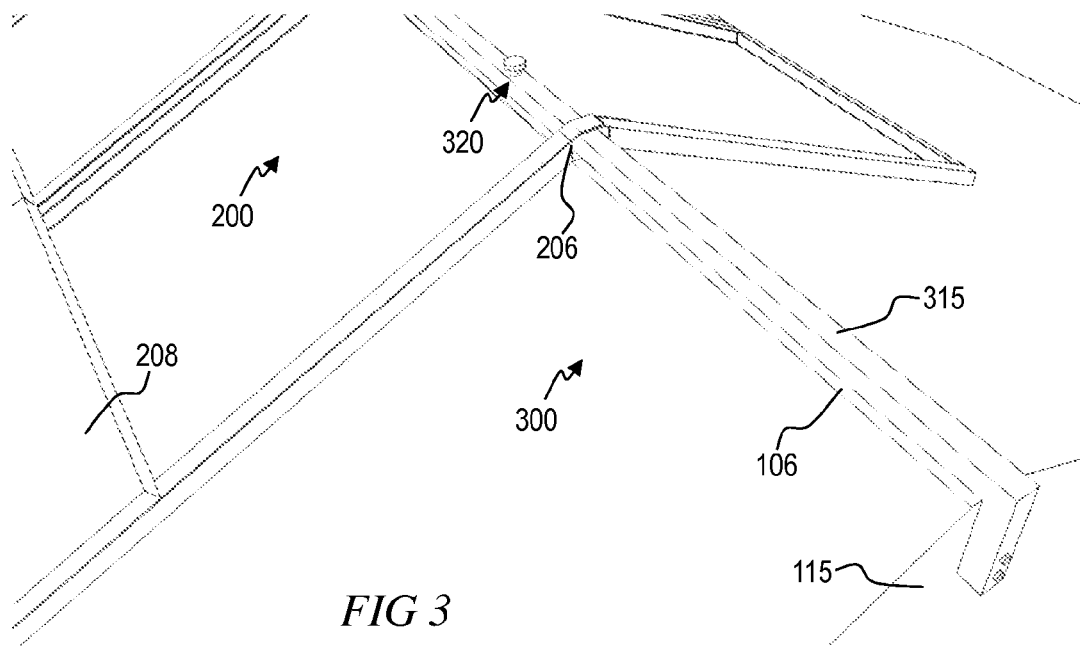
FIG. 3 is a perspective view of gable-penetrating mounting frame, according to some embodiments.

In other embodiments, as shown in FIG. 3, a gable-penetrating mounting frame 300 can comprise a gable-mounted pivot-bar 315. The pivot-bar 315 would run substantially parallel to the roof line 106, with each end being mounted to opposing gables 115. The pivot-bar 315 would be rotatably attached to the mounting frame 200 at or near the plurality of hinges or arm connection points 206, thereby providing enhanced wind-induced position disruption protection, without penetration of the rooftop. One or more roof-penetrating anchoring points 320 may be required at or near the roofline depending on the length of the pivot-bar 315 and roofline 106. For example, for a roofline greater than about 20 feet, greater than about 25 feet, or greater than about 30 feet, it may be necessary to attach the center of the pivot-bar to a roof-penetrating anchor point. Other customizable features described above may obviate use of roof-penetrating anchor points for embodiments which comprise gable-mounted pivot-bars.

The mounting frames previously disclosed may be incorporated with other components to provide a roof-mountable solar photovoltaic power system. Such systems may comprise one or more solar photovoltaic panels 400 capable of generating electrical power, a power inverter 410 and a power outlet, as depicted schematically in FIGS. 4A, 4B, and 4C. The power inverter 410 may comprise a power source meter and switch, capable of converting DC power to AC power. In some embodiments the system is capable of outputting DC power, AC power, or both DC and AC power. In some embodiments the system may comprise a quick-connection point for supplying power. Power may be supplied to electrically-powered devices, the power grid 440, or external energy storage units 430. In some embodiments the system includes an internal energy storage system, such as a rechargeable battery, a flywheel, a closed cycle fuel cell, or combinations thereof. The energy storage units may deliver power at a controlled or required rate, and may additionally simultaneously store energy.

In some embodiments the system may comprise one or more snow removing, wiping, and cleaning devices, which may be operated or powered by battery, hand-crank, wind turbine, or other suitable means. Examples of such snow removal devices can be found in co-owned U.S. Patent Application 20110308574 A1 titled "SOLAR POWERED ELECTRICAL GENERATION DEVICE AND RELATED METHODS", the disclosure of which is herein incorporated by reference. Such optional snow removing devices 450 are shown in FIGS. 4A-C.

Figure 4A:
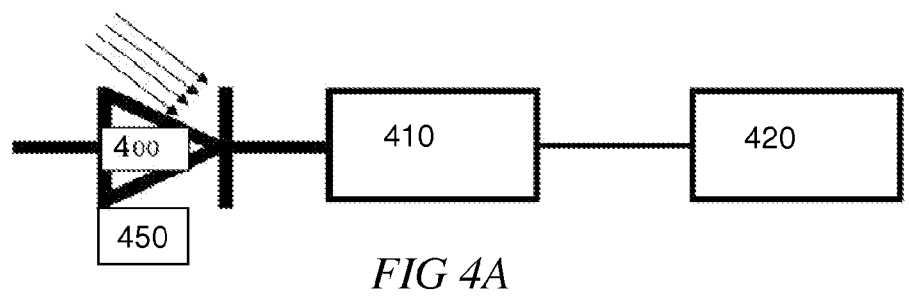
FIG. 4A is a schematic view of a solar photovoltaic power generator connected to a power source meter and switch, and a utility grid.
Figure 4B:
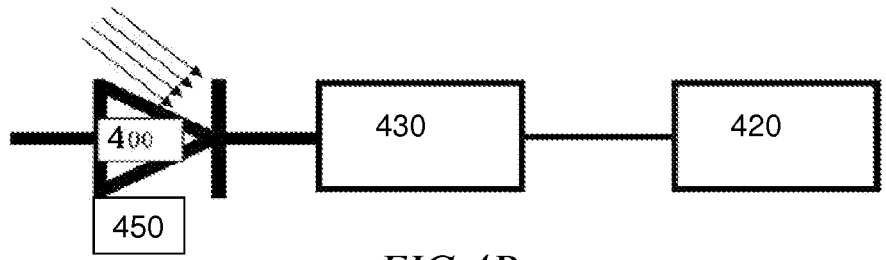
FIG. 4B is a schematic view of a solar photovoltaic power generator connected to an energy storage system and a utility grid.
Figure 4C:
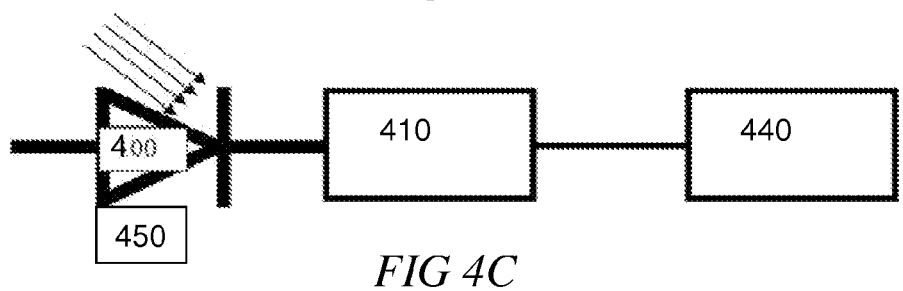
FIG. 4C is a schematic view of a solar photovoltaic power generator connected to a power source meter and switch, and a secondary power generator.

The system may deliver electrical power to an electrical utility grid 420, depicted schematically in FIG. 4A and FIG. 4B as an electrical utility conductor, through a generated power source meter and switch 410. The generated power delivery switch 410 is capable of controlling the amount of electrical power from the power source 400 delivered to the electrical utility grid 420. Some embodiments may also include a secondary power generator 440 to aid in a simulated grid connected system as in FIG. 3D. The purpose of the secondary power generator is to supply grid frequency appropriate for the power source and switch 410.

Advantages of the solar photovoltaic power systems described herein are realized further realized in their "plug-and-play" capability, wherein prefabricated modular systems can be quickly and efficiently installed on virtually any rooftop and immediately begin delivering or storing power. Examples of such "Plug-and-play" devices can be found in co-owned U.S. Patent Application 20110308574 A1 titled "SOLAR POWERED ELECTRICAL GENERATION DEVICE AND RELATED METHODS", the disclosure of which is herein incorporated by reference.

What is claimed is:

1. A modular, roof-mounted solar energy apparatus comprising:
    a mounting frame having:
        a plurality of brackets each having a first arm connected to a second arm at a connection point wherein the plurality of first arms form a first plane and the plurality of second arms form a second plane and the first plane is different from the second plane;
    one or more solar panels;
    a power inverter; and
    a power outlet;
    wherein the apparatus is securably positioned with the one or more connection points directly above a roof peak, a roof valley or a roof edge proximate a roof line or edge without penetrating the roof.

2. The apparatus of claim 1 wherein one or more solar panels are positioned on the first plane, the second plane, or both.

3. The apparatus of claim 1 wherein at least one of the plurality of brackets comprise one or more holes.

4. The apparatus of claim 1 further comprising a pivot-bar attachable to one or more opposing roof gables.

5. The apparatus of claim 1 wherein the apparatus is capable of maintaining its position on a roof in winds up to about 105 mph.

6. The apparatus of claim 1 further comprising a snow removal device.

7. The apparatus of claim 1 further comprising an adhesive located at least between the mounting frame and the rooftop.

8. The apparatus of claim 7 wherein the adhesive comprises a coefficient of thermal expansion between or equal to one of the coefficient of thermal expansion of the roof surface and the coefficient of thermal expansion of the mounting frame.

9. The apparatus of claim 1, further comprising an internal energy storage system comprising one or more of a rechargeable battery, a flywheel, and a closed cycle fuel cell.

10. The apparatus of claim 1 further comprising ballasting weights.

11. The apparatus of claim 1 wherein the length of each first arms and second arms are adjustable.

12. The apparatus of claim 1 wherein the connection point comprises a hinge.

13. The apparatus of claim 12 wherein the hinge is adjustable and lockable.

* * * * *